G. RADUJKOV AND W. H. H. ZENTMYER.
LOCKING DEVICE FOR AUTOMOBILES.
APPLICATION FILED MAY 26, 1919.
1,312,354.
Patented Aug. 5, 1919.
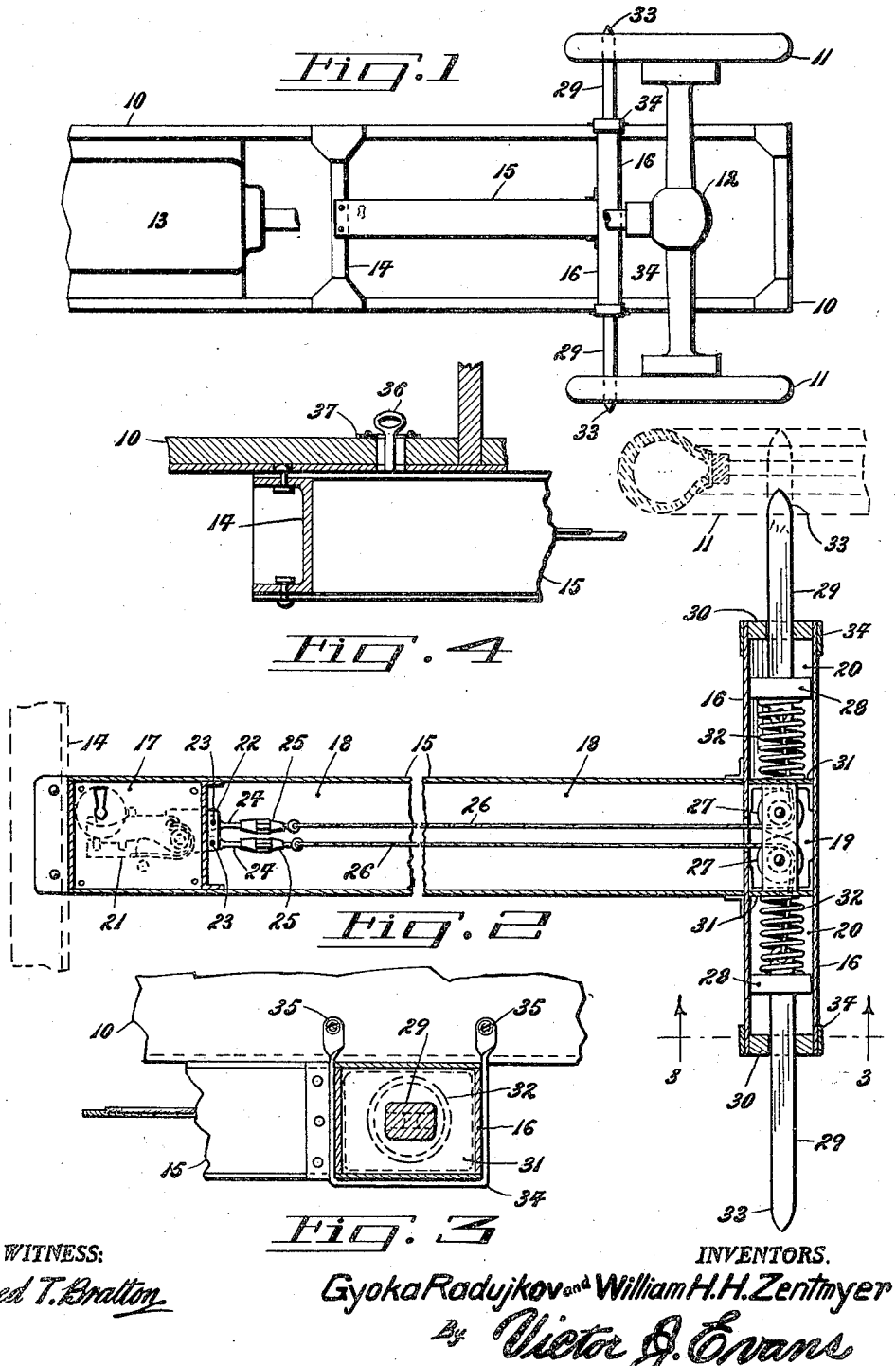
WITNESS:
Alfred T. Bratton
INVENTORS.
Gyoka Radujkov and William H. H. Zentmyer
By Victor J. Evans
ATTORNEY.

UNITED STATES PATENT OFFICE.

GYOKA RADUJKOV AND WILLIAM H. H. ZENTMYER, OF PHILADELPHIA, PENNSYLVANIA.

LOCKING DEVICE FOR AUTOMOBILES.

1,312,354.  Specification of Letters Patent.  Patented Aug. 5, 1919.

Application filed May 26, 1919. Serial No. 299,772.

*To all whom it may concern:*

Be it known that we, GYOKA RADUJKOV and WILLIAM H. H. ZENTMYER, a citizen of Servia and a citizen of the United States, respectively, residing at Philadelphia, in the county of Philadelphia and State of Pennsylvania, have invented new and useful Improvements in Locking Devices for Automobiles, of which the following is a specification.

This invention relates to locking devices for automobiles or other vehicles and it has more particular reference to that type of device which is adapted to lock the rear wheels of an automobile when the owner of the machine or similar vehicle is absent.

The main object of this invention is to provide a locking device of the type referred to which is of simple and durable structure, readily installed, and which when applied to an automobile for example, will effectually lock the machine or other vehicle against further travel movement and thereby prevent its illicit use or theft.

With this and other objects in view the invention consists essentially in the novel features of construction, combination and arrangement of the several parts hereinafter fully described and more particularly pointed out by the appended claims.

In further disclosure of the invention reference is to be had to the accompanying sheet of explanatory drawings, constituting a part of this specification, in which similar characters of reference designate the same or similar parts in all the views; and in which:—

Figure 1— is a fragmentary diagramnatic underside plan of part of an automobile chassis and rear wheels having our invention applied thereto.

Fig. 2— is a sectional view of the locking device drawn to an enlarged scale, and a fragment of one of the rear wheels indicated by dotted lines.

Fig. 3— is an enlarged sectional elevation taken on the line 3—3 in Fig. 2, and looking in the direction of the arrows thereon; and Fig. 4— is an enlarged fragmentary section of the locking device case head and key and also illustrating the connection thereof to the understructure of the automobile or other vehicle.

In the drawings the chassis or underframe of an automobile is designated by the numeral 10 and is shown as having mounted thereon, rear driving wheels 11, while the drive is indicated by the numeral 12, and the motor by the numeral 13.

According to our invention we secure across the chassis 10, at any convenient position, a cross piece or bracket 14 to the underside of which is firmly attached a longitudinal and rearwardly extending casing 15 having laterally extending parts 16 located so that their common axis lies within the periphery of the driving wheels 11.

This casing 15 is made cellular and is divided into compartments 17, 18, 19, and 20—20, and in the forward compartment 17 there is securely mounted a lock 21 of appropriate make and having its bolt 22 transversely grooved to house a pair of vertically mounted pins 23, to which are hingedly connected eye bolts or the like 24, in turn threaded at their free ends into turnbuckles 25, to which are similarly connected the ends of rearwardly extending wires or chains 26 disposed in the compartment 18. These wires or chains 26 are passed around grooved pulleys 27 conveniently mounted in the compartment 19 and are axially conducted, the one to the right hand and the other to the left hand, into the compartments 20, where they are securely attached to the inner ends of plungers 28, provided with axially extending bars or rods 29, of appropriate cross section and which protrude laterally through the closed in outer ends 30 of said compartments 20. Between the plungers 28 and the inner walls 31 of the compartments 20, are disposed strong compression springs 32, whose normal tendency is to keep the bars or rods 29 outwardly projected into the path of the driving wheels 11, so that they would lie between the spokes thereof; and it is to be noted that the ends of said bars or rods 29, are somewhat pointed at 33 so as to more effectively insure their riding smoothly over the spokes and not becoming jammed thereagainst.

Straps 34 serve to support and clamp the rear ends of the casing 15 firmly to the underside of the chassis 10, and they are securely held in place by screws or bolts 35— Fig. 3.

In use it will be readily seen, that by turning the key 36—which is preferably removable—passed through the key hole 37, located in the floor of the car, one or more times according to the construction of the lock to retract the bolt 22, thereof, that a pull is exerted on the wires or chains 26 which will in turn withdraw the bars or rods 29 from the path of the spokes of the driving wheels 11, in opposition to the springs 32 whereupon the vehicle is free to be driven. On the other hand, when it is desired to park the vehicle, the operation of turning the key 36 in the opposite direction will project the bolt 22, from its housing and the springs 32 will be freed to exert their full force to project the plungers 28 and bars or rods 29, laterally outward into the path of the driving wheels 11, between the spokes thereof, whereby the vehicle is effectively prevented from forward or rearward movement, or illicit removal or theft.

Should it happen at any time that the wheels 11 are not exactly parallel with the body of the vehicle or that the spokes thereof lie directly in the path of the ends of the bars or rods 29, it will be easily seen that the pointed ends 33 thereof, will tend to ride smoothly over the surface of the spokes and not cause injury thereto. Likewise if the wheels 11 should not exactly correspond, that is to say should the spokes in one wheel not exactly aline radially with those of the other wheel 11, one bar or rod 29 may be projected between the spokes of its corresponding wheel while the other may be held against a spoke of its corresponding wheel, in which event a slight movement of the car in a forward or rearward direction will immediately result in said bar or rod 29 being completely projected into effective locking position. In other words, due to the yieldingly mounted disposition of the bars or rods 29, we have provided an effective means whereby the vehicle will be locked in the event one of the bars or rods 29 being impeded or failing to be projected into its effective operative position.

It is furthermore to be noted that by our invention, we have provided a locking device for automobiles and other vehicles which can be operated by the driver before leaving his seat in the vehicle, and in order to effectively prevent the ends of the bars or rods 29 from injuring the spokes of the wheels 11, they may be sheathed with hard rubber caps or the like.

From the foregoing description it will be seen that by our invention we provide a locking device of simple and durable structure, while it can be easily manipulated for locking the automobile or other vehicle against traveling movement, and we wish it clearly understood that we do not consider ourselves limited to the specific embodiment illustrated, as reasonable changes in the shape and other combinations of the parts may be effected without in any way departing from the spirit and scope of said invention, as more particularly pointed out by the appended claims.

Having described our invention, what we claim is:—

1. A locking device for vehicles adapted to be secured to the underframe and comprising in combination, a T-shaped casing, a lock disposed in the leg portion, flexible connections from the bolt of said lock connecting with spring influenced plungers located in the cross portion of said T-shaped casing and having protruding members adapted to be projected between the spokes of the wheels to lock the vehicle against traveling movement.

2. A locking device for vehicles adapted to be rigidly secured to the underframe comprising in combination, a T-shaped casing the long leg whereof is disposed longitudinally of the vehicle and the cross portion transversely thereof, a bolt and locking mechanism disposed in the forward end of the leg portion, a plurality of adjustable flexible connections from the bolt running longitudinally of said leg portion and turned axially the one to the right hand and the other to the left hand of the cross portion of the T-shaped casing, spring influenced plungers located in the outer ends of the cross portion having the ends of the flexible connections secured thereto, laterally projecting members axially integral with the plungers and adapted to be projected between the spokes of the wheels, and means for manipulating the locking mechanism to lock the vehicle against traveling movement or withdraw the projecting members into inoperative position.

3. A locking device for vehicles adapted to be rigidly secured to the underframe comprising in combination, a T-shaped casing the long leg whereof is disposed longitudinally of the vehicle and the cross portion transversely thereof, a bolt and locking mechanism in the forward end of the leg portion, a flexible T-shaped connection from the bolt to plungers in the outer ends of the cross portion, springs normally tending to project the plungers outwardly, laterally and outwardly disposed members projecting from the plungers, and means for manipulating the locking mechanism whereby the laterally and outwardly projecting members may be released to move into locking position with respect to the vehicle wheels or withdrawn to inoperative position.

In testimony whereof we affix our signatures.

GYOKA RADUJKOV.
WILLIAM H. H. ZENTMYER.